United States Patent [19]

Tambussi

[11] 4,379,013

[45] Apr. 5, 1983

[54] FINE FILM PRESSURE BAGS FORMING COMPOSITE STRUCTURES

[75] Inventor: William C. Tambussi, Cherry Hill, N.J.

[73] Assignee: The Boeing Company, Seattle, Wash.

[21] Appl. No.: 192,571

[22] Filed: Sep. 30, 1980

[51] Int. Cl.$^3$ ............................................. B32B 31/00
[52] U.S. Cl. .................................... 156/189; 156/245; 156/287; 156/500; 264/257; 264/314; 264/317
[58] Field of Search .............. 156/156, 285, 287, 189, 156/214, 227, 245, 189–192, 500; 264/314, 316, 317, 258, 257

[56] References Cited

U.S. PATENT DOCUMENTS

| | | | |
|---|---|---|---|
| 3,265,795 | 8/1966 | Medney | 264/313 X |
| 3,348,476 | 10/1967 | Brownlee et al. | 264/314 X |
| 4,095,322 | 6/1978 | Scarpatti et al. | 156/182 X |
| 4,096,012 | 6/1978 | Belko et al. | 156/214 |
| 4,202,856 | 5/1980 | Frikken et al. | 264/314 X |
| 4,251,309 | 2/1981 | Class et al. | 156/214 X |

Primary Examiner—David A. Simmons
Attorney, Agent, or Firm—Jones, Tullar & Cooper

[57] ABSTRACT

This invention relates to a method and apparatus for fabricating a composite structure and, in particular, to a method and apparatus for fabricating a hollow composite structure having a dense laminated wall formed by bonding and curing a plurality of resin-preimpregnated fiber sheets or tapes under heat and pressure.

Hollow composite structures may be formed by applying layers of resin-impregnated fabric material onto a pressure bag covering a rigid mandrel, disposing the assembly of the mandrel, pressure bag, and uncured composite layers within an outer mold, transmitting heat to the composite material to cure the resin and applying pressure within the flexible pressure bag to act against the composite material during the curing operation to assure proper dimensions, density, structural properties and wall thickness of the cured composite structure.

11 Claims, 8 Drawing Figures

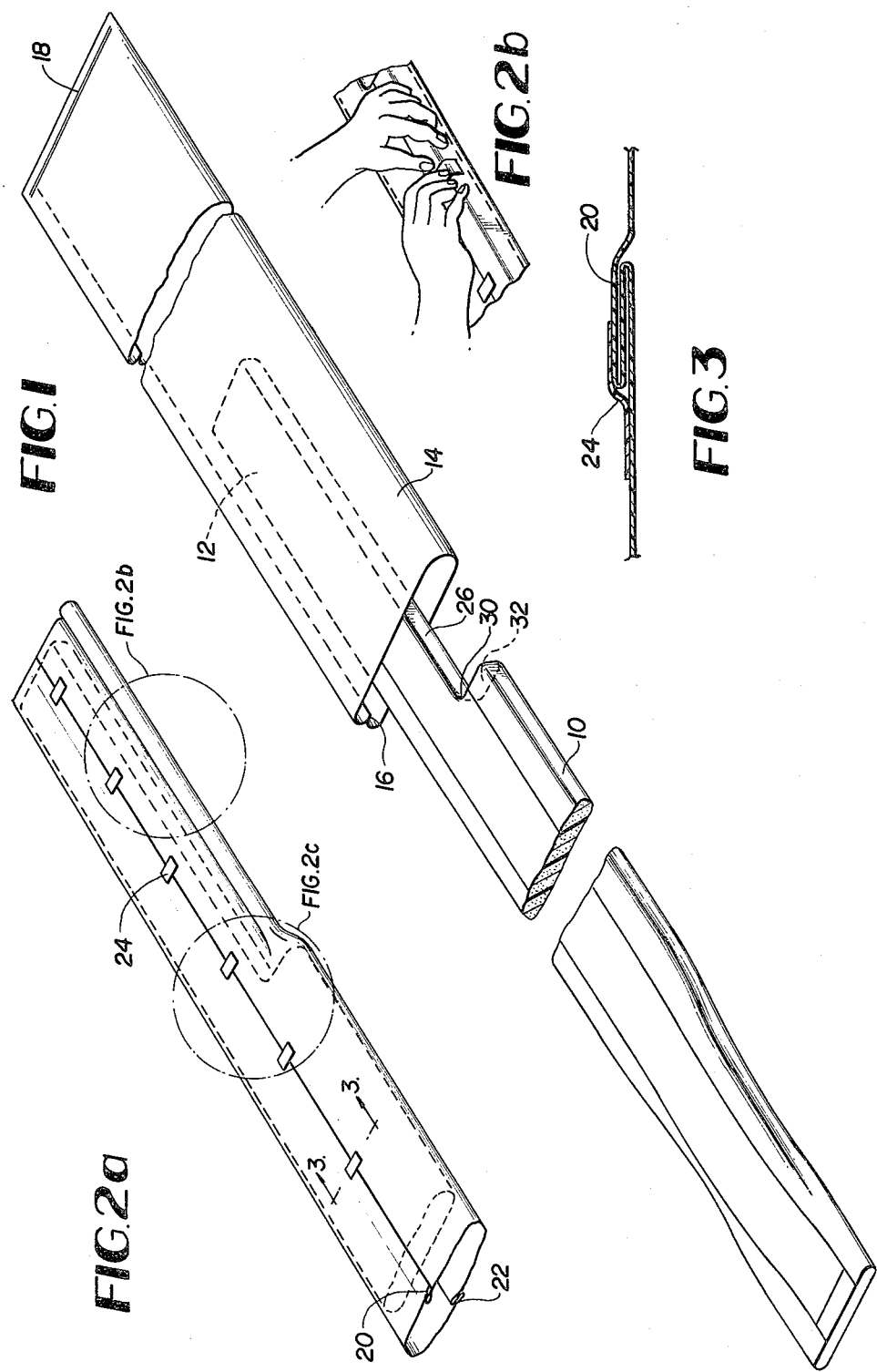

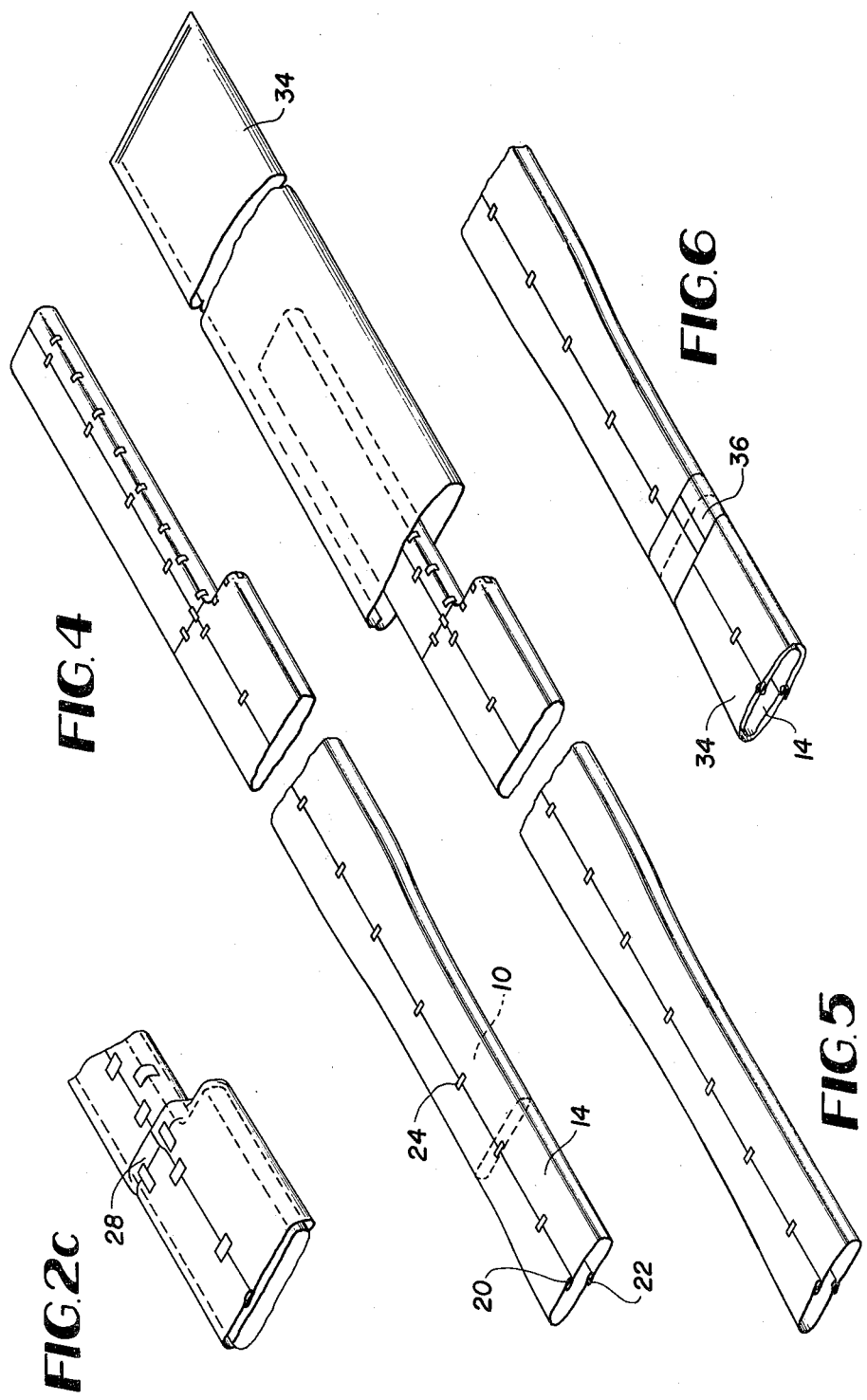

FINE FILM PRESSURE BAGS FORMING COMPOSITE STRUCTURES

BACKGROUND OF THE INVENTION

In the past, many of the composite structures designed and fabricated for aerospace use have been composed of thin fabric laminate and sandwich skins, which require relatively light pressure on the composite material during the curing operation. Consequently, thin plastic film pressure bags can be used to apply pressure to these laminated composite structures during the curing operation. In such composite structures, woven fabric is commonly used to help maintain the fiber alignment and uniform wall thickness.

Following the development of fatigue resistant, unwoven, preimpregnated tapes of monofilament fiber, these tapes were used to fabricate heavy load-bearing structures such as the spar of a composite aerodynamic rotor blade assembly similar to that described in U.S. Patent No. 4,095,322 to Scarpatti et al., issued June 20, 1978. However, light pressure devices such as the thin film plastic pressure bags earlier described were found to be unsuitable for these dense, thickwalled composite structures. As a result of a large bulk factor (the ratio of cured/uncured wall thickness), fiber drift, uneven resin flow, and entrapped air in the composite, when these heavy laminated structures were formed using thin film pressure bags, the cured product invariably exhibited many irregularities on the inside wall surface and a lack of consistent wall thickness. Further, the rough inner wall surface greatly increased the risk of failure of the fine film pressure bag by puncturing, which also resulted in a defective product.

For these reasons, until the present invention, rigid caul plates and heavy elastomeric pressure bags of silicone rubber, having a wall thickness in the range of 1/16 to ½ inch, have been used to form these dense, thickwalled, heavy load-bearing, composite structures.

The initial fabrication cost of the silicone rubber pressure bags is very high, in comparison to thin film plastic bags, and the characteristics of silicone rubber are such that the entire surface of the silicone rubber pressure bag must be covered with Teflon tape, which acts as a release medium. Also, damage to the silicone rubber pressure bag frequently occurs during the removal of this bag from the cured composite structure, necessitating costly bag repairs and retesting for leaks.

OBJECTS AND SUMMARY OF THE INVENTION

Hence, it is an object of the invention to disclose a method of forming and curing dense, thick-walled, high strength composite structures using low cost disposable pressure bags of thin plastic film.

A first thin-film pressure bag is formed from high strength film material having inherent release characteristics such as PVF (polyvinyl fluoride) or Teflon, a material manufactured by E. I. DuPont Company, Wilmington, Delaware, so that the pressure bag can be used both as the pressure medium acting on the composite structure during the curing process, and as a release medium on completion of the curing process. Generally, the thickness of the film material selected will be in the range of 0.002 to 0.010 inches.

The pressure bag is formed to have greater overall dimensions than the mandrel about which it is to be disposed, to prevent failure of the pressure bag by excessive stretching of the bag during the curing process. After the pressure bag is formed and tested for leaks, the mandrel is inserted within the pressure bag, the pressure bag is folded so that it conforms closely to the shape of the mandrel and has at least one overlapped portion extending the length of the mandrel. Also, where required, the pressure bag may be folded to include at least a second overlapped portion extending about the mandrel orthogonally of the first longitudinally overlapped portion. After the pressure bag has been so folded to conform closely to the shape of the mandrel, it is held in this position by pieces of tape applied at spaced intervals along the overlapped portions of the bag. This tape is selected to have low pressure release characteristics, so that when pressure is applied within the pressure bag, these pieces of tape will release and allow the bag to expand. Thus, the pressure bag can be enlarged during curing of the composite structure to maintain pressure against the inner wall of the structure without the wall of the pressure bag being dangerously reduced in thickness by stretching.

Next, to further reduce the risk of puncture of the pressure bag during forming of the composite structure, the mandrel and first pressure bag affixed to it are inserted within a second pressure bag identical to the first pressure bag, which is then folded and taped in the same manner as the first pressure bag to closely conform to the shape of the mandrel disposed therein. Thus, if the outer bag is punctured by contact with a sharp point formed on the inner surface of the composite structure during the curing operation, pressure will still be maintained on the composite structure by the second inner bag.

Next, the open ends of the two pressure bags are connected to a source of vacuum to tightly draw the inner bag against the mandrel and the outer bag against the inner bag. In order to maintain the variation of the wall thickness of the composite structure within acceptable limits when this composite structure is formed using thin-film pressure bags, contoured straps of composite material are formed and applied about the mandrel using the method described in U.S. Pat. No. 4,096,012 to Belko et al., issued June 20, 1978. In this method a simplified lay-up mandrel with no contour or twist is mounted on an automatic tape layup machine which forms each contoured strap by laying-up preimpregnated tape of nonwoven fiber onto the mandrel to the desired thickness. The layed up strap is then removed from the simplified mandrel and placed in a forming die where it is contoured to the desired shape by coining. The contoured straps are then mounted about the mandrel on the outer pressure bag to form complimentary portions of the support structure layup. It has been found that a machine laid up composite support structure formed in this manner includes considerably less entrapped air than a manually laid up composite structure. Consequently, when this automated layup method is used in a process of forming a composite support structure using thin film pressure bags, the bulk factor of the composite material, which is proportional to the entrapped air, is reduced and the variation in wall thickness of the support structure is likewise reduced to maintain this variation of wall thickness within acceptable limits.

Following the layup of the composite material about the mandrel, the entire subassembly is subjected to cold compaction, which further decreases the entrapped air and places the fibers within the uncured composite material closer to their final cured position.

Next the subassembly is placed within a mold assembly which determines the final shape of its outer surface, and pressure and heat are applied to effect curing of the composite material. Typically, the pressure and heat applied to the composite material fall within the ranges of 15–100 psi and 250°–400° F., respectively. The open ends of the two composite pressure bags are sealed together, and connected to a source of pressure so that these pressure bags will exert a uniform pressure against the inner wall of the composite support structure, even though the failure of one of these pressure bags occurs during the curing process. The material, having inherent release characteristics, from which the pressure bags are formed, is not wetted by the adhesive or resin materials being cured. Consequently, there is no chemical of molecular adhesion of the resin to the pressure bags, and these pressure bags can be easily stripped from the inner wall of the cured composite support structure.

The invention will be better understood as well as further objects and advantages that will become more apparent from the ensuing detailed description of a preferred embodiment taken in conjunction with the drawings.

BRIEF DESCRIPTION OF THE DRAWINGS

FIG. 1 is a perspective view showing a disposable rigid support mandrel for the spar of a composite rotor blade for a helicopter being inserted into a first thin-film pressure bag, according to the invention, with center portions of the mandrel and bag having been removed;

FIG. 2a is a perspective view of the tip end of the helicopter rotor blade spar support mandrel of FIG. 1, showing initial steps of folding and taping the first pressure bag about the spar support mandrel;

FIGS. 2b and 2c, are enlarged views of portions of FIG. 2a showing additional steps of folding and taping the first pressure bag to conform to the mandrel;

FIG. 3 is a cross-sectional view of a portion of the first pressure bag, taken along the line 3—3 of FIG. 2a, showing one of the folded portions of the pressure bag;

FIG. 4 is a perspective view of the mandrel and first pressure bag of FIG. 1, in which the pressure bag has been folded and taped to conform to the mandrel disposed within the first pressure bag;

FIG. 5 is a perspective view showing the mandrel and first pressure bag assembly of FIG. 4 being inserted into a second thin-film pressure bag; and FIG. 6 is a perspective view of the root end of the mandrel of FIG. 1 shown after the second pressure bag has been folded and taped in the same manner as the first pressure bag to conform to the spar layup mandrel.

DESCRIPTION OF A PREFERRED EMBODIMENT

FIG. 1 shows a disposable (styrofoam) layup mandrel 10 for a tubular spar of a composite rotor blade for a helicopter, which may be the same or similar to that described in U.S. Pat. No. 4,095,322, issued June 20, 1978 to Scarpatti et al. which is hereby incorporated by reference. In FIG. 1, the tip end 12 of the mandrel 10 is shown being inserted into a first thin-film pressure bag 14.

The pressure bag 14 is formed of 0.002" PVF film, a high strength thermoplastic material having inherent release characteristics. A rectangular shaped piece of PVF film is folded lengthwise, and heat and pressure is applied along its longitudinal edges to form a pressure-tight longitudinal seam 16. In the same manner, heat and pressure are applied to one of the ends of the folded film to form a pressure-tight transverse seam 18. The bag as formed by the seams 16, 18 is then turned inside out, so that the seams 16, 18 extend inwardly, and pneumatic pressure is applied within the completed bag 14 to assure that it is pressure-tight.

After the layup mandrel 10 has been inserted into the pressure bag 14, the pressure bag 14 is folded and taped to closely conform to the layup mandrel 10, as shown in FIGS. 2a, 2b, and 2c. First the bag is folded to form top and bottom longitudinal folds 20,22, which are secured with pieces of Teflon tape 24, which also has inherent release characteristics. The tape 24 is sparsely applied, typically at 12 inch intervals, so that the tape 24 can be easily released by pressure within the bag to allow the bag 12 to expand and exert pressure against the inner wall of the composite support spar during the curing operation.

The two longitudinal folds, 20, 22 are formed so that the bag 14 closely conforms to the surface of the layup mandrel 10, except for the mandrel tip end 12, which has a much smaller periphery than the remainder of the mandrel 10. The tip end of the pressure bag 14 is made to conform to the mandrel tip end 12 by longitudinally folding the loose side of the pressure bag 14 several times, as shown in FIG. 2a and taping this folded portion against the side 26 of the mandrel tip end 12, as shown in FIG. 2b.

Next, the pressure bag 14 is folded to form a chordwise fold 28 extending laterally about the inner portion of the mandrel tip end 12, and Teflon tape is applied to secure this fold 28 as shown in FIG. 2c.

Finally, Teflon tape is applied to hold the pressure bag 14 tightly against the inside corner 30 formed between the side 26 of the mandrel tip end 12 and the traverse extending side 32 of the main portion of the mandrel 10.

This assembly of the layup mandrel 10 and the first pressure bag 14, shown in FIG. 4, is inserted within a second thin-film PVF pressure bag 34 similar to the first pressure bag 12, as shown in FIG. 5. The second pressure bag 34 is folded and taped in the same manner as described above for the pressure bag 12, so that the second pressure bag also conforms to the layup mandrel 10. A silicone rubber protective sleeve 36 is placed about the root end of the layup mandrel 10 to protect the two pressure bags 14, 34 and hold them securely against the mandrel 10.

Prior to the laying up of composite material about the mandrel 10, the open ends of the pressure bags 14, 34 are sealed to one another and to a vacuum fitting by vacuum sealing tape. The vacuum fitting is then connected to a source of vacuum, to evacuate air within the pressure bags 14, 34, and draw these pressure bags 14, 34, tightly against the layup mandrel 10.

Contoured straps of resin-impregnated fiber tape automatically layed up and formed by an automatic tape layup machine are then disposed about the mandrel 10 on the outer surface of the outer pressure bag 34. For example, the contoured straps may be formed by the method described in U.S. Pat. No. 4,096,012, issued June 29, 1978, to Belko et al. on an automatic tape layup machine described in U.S. Pat. application Ser. No. 9,476, filed Oct. 10, 1978 by Belko et al. may be used to form these contoured straps.

After the composite material forming the support spar has been laid up about the mandrel 10, it is placed into a single matched die mold along with other components of the composite helicopter rotor blade assembly and the various components are brought into engagement and secured to each other in the single matched die mold through the application of heat and pressure, as, for example, described in the above referenced U.S. patent application No. 4,095,322. During the curing process, the assembled pressure bags 14, 34 are connected to a source of pressure to exert a continuous pressure against the inner surface of the tubular support spar of approximately 70 to 100 psi during the curing operation.

After the composite rotor blade assembly has been completely cured, the disposable (styrofoam) layup mandrel 10, which has undergone a volumetric reduction, and the inner and outer pressure bags 14, 34 are removed. To remove the outer pressure bag 34, a rod is inserted through the root end of the pressure bag 34 and attached to the tip end of the pressure bag 34. The rod is then simultaneously twisted and withdrawn from the rotor blade assembly to strip the outer pressure bag 34 from the inner surface of the cured support spar.

The cost of the two disposable thin-film pressure bags 14, 34 is approximately $15.00, whereas the cost of the reuseable silicone rubber pressure bags previously used in manufacturing helicopter composite rotor blade spars is approximately $700.00. Also, approximately 55 more manhours are required for each composite rotor blade when a reuseable silicone rubber pressure bag is used, than when the two disposable pressure bags 14, 34 are used. This is due to the fact that each time one of the silicone rubber pressure bags is used, it has to be completely covered with a release medium such as Teflon tape.

It is obvious to one skilled in the art, that many modifications, variations, and adaptations may be made to the preferred embodiment described herein without departing from the spirit and scope of the invention. For example, existing silicone rubber pressure bags need not be scrapped, but can be used in place of the inner pressure bag 14. In such an adaptation, the use of the disposable, outer, thin film pressure bag 34 with an inner silicone rubber pressure bag greatly reduces the fabrication costs, by eliminating the need to completely cover the silicone rubber pressure bag with Teflon tape each time the silicone rubber pressure bag is used. Thus, it is intended that the scope of the invention be limited only by the appended claims.

What is claimed is:

1. In an apparatus for curing a tubular composite structure of laminated, resin-impregnated fibrous material which includes structure retaining means having a contoured inner surface adjacent the outer surface of the composite structure and pressure bag means disposed within and extending between opposite ends of the composite structure, for applying pressure to the inner surface of the composite structure, the improvement wherein the pressure bag means comprises at least one pressure bag formed of a material having inherent release characteristics and adapted to be connected to a pressure source, and the pressure bag includes at least one overlapped folded portion extending between the opposite ends of the adjacent composite structure, to allow the pressure bag to expand radially against the inner surface of the composite structure when the pressure bag is connected to the pressure source.

2. An apparatus, as described in claim 1, wherein the pressure bag means comprises two pressure bags, one disposed within the other.

3. An apparatus, as described in claim 2, wherein adjacent ends of the two pressure bags are sealed together to form a common end portion which is connected to the pressure source.

4. An apparatus, as described in claim 1, wherein said at least one pressure bag is formed of thin film PVF material.

5. An apparatus, as described in claim 1, wherein said at least one overlapped folded portion comprises a plurality of said overlapped folded portions which are uniformly spaced about the pressure bag.

6. In an expandable pressure bag assembly for continuously applying pressure to the inner surface of a tubular composite structure during curing of the composite structure, which is closely disposed about a rigid mandrel and is adapted to be connected to a pressure source, wherein the pressure bag assembly includes an outer layer of a material having inherent release characteristics, about which contoured straps of layered, resin-impregnated fibrous material are disposed to form the composite structure, the improvement wherein the pressure bag assembly comprises:
   an inner expandable pressure bag, closely disposed about the mandrel and adapted to be connected to the pressure source; and
   an outer pressure bag of material having inherent release characteristics, which is disposed about and conforms closely to the inner pressure bag, wherein the outer pressure bag includes at least one overlapped folded portion extending between opposite ends of the adjacent composite structure, to allow the outer pressure bag to expand radially against, and continuously apply pressure to, the inner surface of the composite structure when the inner pressure bag is connected to the pressure source.

7. A pressure bag assembly, as described in claim 6, wherein the inner pressure bag is formed of material having inherent release characteristics, and includes at least one overlapped folded portion extending between opposite ends of the mandrel, to allow the inner pressure bag to expand radially against, and continuously apply pressure to, the outer pressure bag during curing of the composite structure.

8. A pressure bag assembly, as described in claim 7, wherein adjacent ends of the inner and outer pressure bags are sealed together to form a common end portion which is adapted to be connected to the pressure source.

9. A pressure bag assembly, as described in claim 8, wherein the inner and outer pressure bags are formed of thin film PVF material.

10. In a method for curing a tubular composite structure which includes the steps of forming an elongated mandrel assembly comprising a rigid mandrel and an expandable pressure bag assembly which is closely disposed about the mandrel, has an outer layer of material having inherent release characteristics and is adapted to be connected to a pressure source, laying contoured straps of layered, resin-impregnated fiber material about the mandrel assembly to form the uncured composite structure, disposing an outer mold or die assembly having a contoured inner surface about the uncured composite structure, and simultaneously applying heat and pressure to the composite structure for a predetermined time to effect curing thereof, which includes connecting the expandable pressure bag assembly to the pressure source to effect continuous application of pressure to the inner surface of the composite structure during curing thereof, the improvement wherein the step of forming an elongated mandrel assembly includes:

forming first and second elongate pressure bags of thin film material having inherent release characteristics, each having a longitudinal length and a transverse inner perimeter larger than the longitudinal length and maximum transverse perimeter of the mandrel, and each having an open end and an opposite closed end;

inserting the mandrel into the first pressure bag;

folding the first pressure bag so that it is closely disposed about the mandrel, including forming at least one overlapped folded portion or pleat which extending longitudinally between opposite ends of the mandrel;

inserting the assembly of the first pressure bag and the mandrel into the second pressure bag;

folding the second pressure bag so that it is closely disposed about the first pressure bag, including forming at least one overlapped folded portion or pleat which extends longitudinally between opposite ends of the mandrel;

closing the open end of the second pressure bag by sealing the two pressure bags together adjacent their open ends; and sealing the open end of the first pressure bag about a pressure fitting adapted to be connected to the pressure source.

11. The method of curing a tubular composite structure, as described in claim 10, wherein the steps of folding the first and second pressure bags to form at least one longitudinally-expending pleat in each bag comprises forming a plurality of said pleats which are uniformly spaced about each pressure bag.

* * * * *